June 15, 1937.  J. L. ANDERSON  2,083,588
TRACER APPARATUS
Filed Sept. 1, 1936  2 Sheets-Sheet 1

INVENTOR
James L. Anderson
BY J. F. Brandenburg
ATTORNEY

June 15, 1937.  J. L. ANDERSON  2,083,588
TRACER APPARATUS
Filed Sept. 1, 1936   2 Sheets-Sheet 2
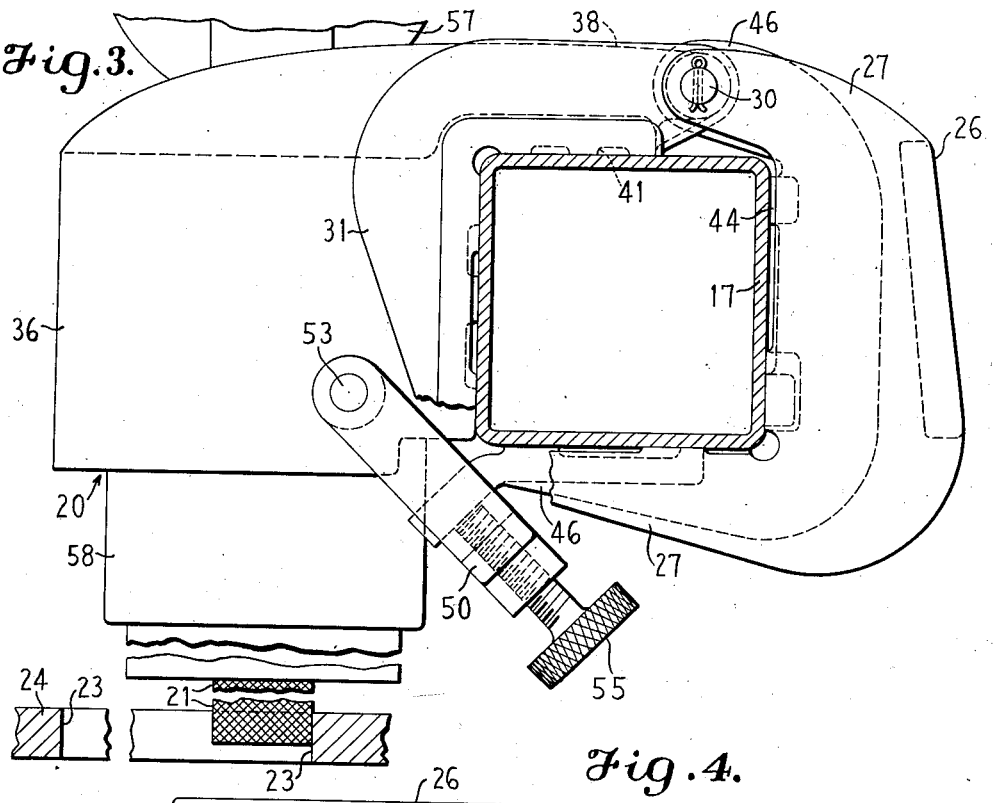
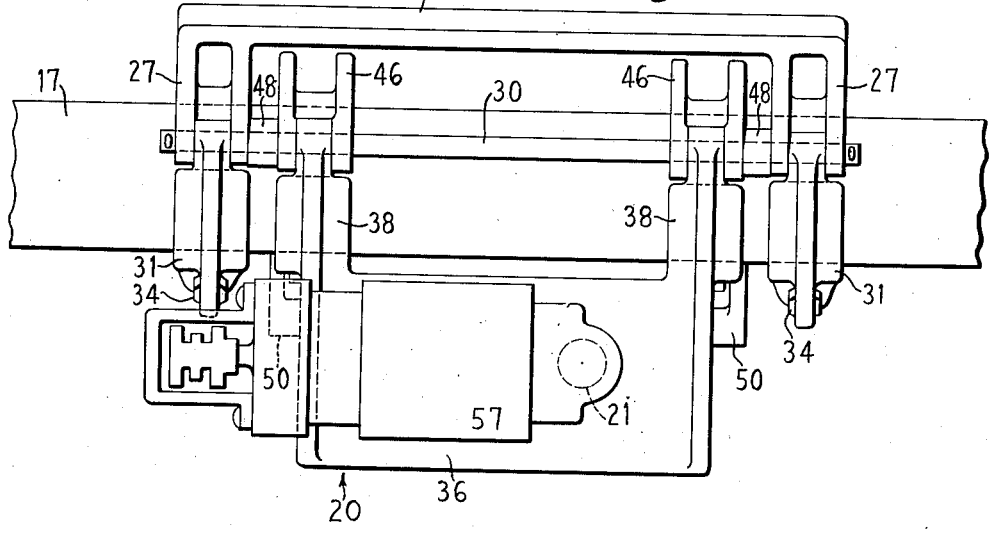
INVENTOR
James L. Anderson
BY J. F. Brandenburg
ATTORNEY Patented June 15, 1937

2,083,588

UNITED STATES PATENT OFFICE 2,083,588

TRACER APPARATUS

James L. Anderson, Closter, N. J., assignor to Air Reduction Company, Incorporated, New York, N. Y., a corporation of New York Application September 1, 1936, Serial No. 98,995

6 Claims. (Cl. 33—25)

This invention relates to tracer apparatus and means by which tracing devices are supported. The expression "tracing device" is used herein in a broad sense to include apparatus for guiding the movement of a torch or other instrumentality from the outline of a pattern which may be a drawing or a template. The preferred embodiment of the invention will be described with a template-follower having a magnetized roller which adheres to the template and is power driven to cause it to roll along the guiding face of the template at uniform speed.

In many cutting machines, a tracing device is supported, for universal movement in a plane, by a jointed arm or frame. A cutting torch is connected to the jointed arm or frame in such a position that it moves in a path similar to that followed by the tracing device. For accurate reproduction it is essential that there be no lost motion in the connections of the torch and tracing device to the supporting arm or frame, or in the structure through which the movements of the tracing device are transmitted to the torch.

With template-followers having a roller which turns on an axis at right angles to the plane of universal movement, the template is secured in position and the follower roller travels along the template edge which has been cut to the desired contour. The guiding surface may be either an inside or an outside edge and is often the continuous side wall of an opening cut through a plate. In the case of such a closed template the movement of the frame which supports the torch and template-follower may be inconveniently limited when it is advantageous, between cutting operations, to swing the supporting frame out of the way while the work is being removed and a new plate located in position to be cut according to the same template.

It is an object of this invention to provide improved tracer apparatus, and to provide a supporting means which is simple and inexpensive, and on which the tracing device is capable of movement to raise and lower it with respect to a pattern, while at the same time effectively avoiding lost motion when the tracing device is in working position.

Another object of the invention is to connect a template-follower with a supporting frame in such a manner that the template-follower can be raised clear of the template but can be quickly locked against movement relative to the frame when lowered into working position.

The preferred embodiment of the invention comprises a template-follower bracket which clamps on the bar of a universal cutting machine and to which the template-follower is attached by a hinge connection. There are simple clamping means for holding the template-follower against movement relative to the bracket clamped on the bar, and the clamping means is quickly secured or released.

Other objects, features and advantages of the invention will appear or be pointed out as the specification proceeds.

In the accompanying drawings, forming part hereof:

Fig. 3 is an enlarged top plan view of the structure shown in Fig. 2, but with the template-follower lowered into working position; and Fig. 4 is an enlarged end view of the structure of Fig. 3 with a part of the bracket broken away to show the template-follower clamp immediately behind it.

Figure 1:
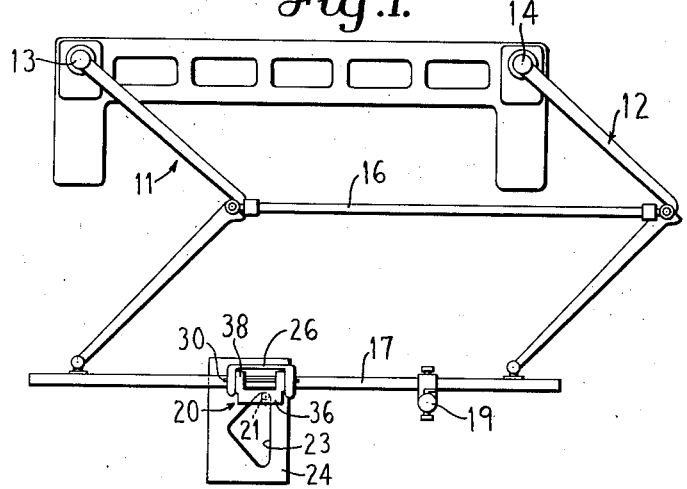
Fig. 1 is a diagrammatic top plan view of a universal cutting machine having a folding parallelogram frame to which the template-follower and torch are connected.
Figure 2:
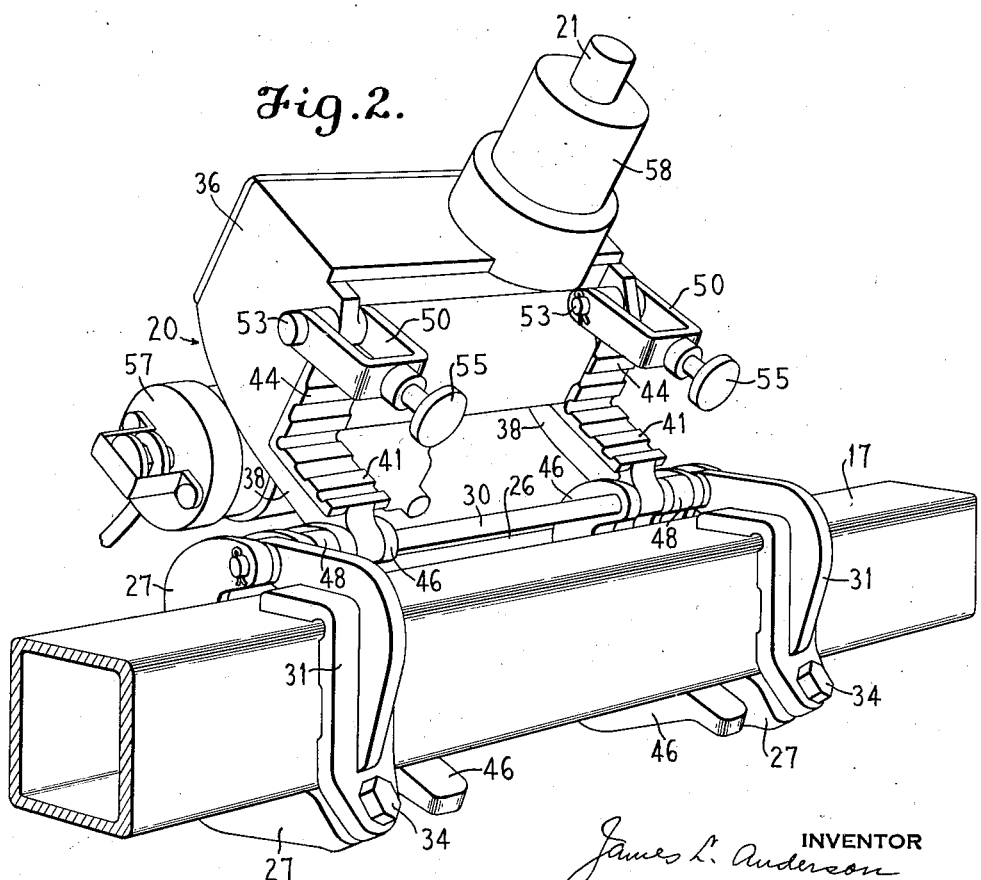
Fig. 2 is an enlarged perspective view illustrating the manner in which the template-follower is connected with the frame of the universal cutting machine, the template-follower being shown in raised position.

The universal cutting machine shown in Fig. 1 comprises two jointed arms 11 and 12 pivotally supported by parallel posts 13, 14, respectively. In modern machines of this kind the arms 11 and 12 have only pivotal movement on the posts 13, 14 and no movement axially along the posts to raise and lower the frame supported by the arms. The arms 13 and 14 are connected and held in parallel relation by two links comprising a bar 16 extending between the joints of the arms 11, 12, and a front bar 17 pivotally connected to the forward ends of the jointed arms.

The bars 16, 17 and the forward links of the jointed arms form a folding parallelogram frame, and the front bar 17 has universal movement in a plane. Since the front bar always moves parallel to itself, all points on that bar move along similar paths no matter which way the bar is moved. A torch 19 attached to the bar 17, therefore, follows the same path as a template-follower 20 connected to the bar at another location.

The template-follower 20 has a power-driven roller 21 which follows an inside guiding surface 23 of a template 24. The roller 21 is magnetized so that it is attracted to the template with sufficient force to supply the friction necessary for traction along the template. The folding parallelogram frame moves freely so that it offers little resistance to the movement of the roller along the edge of the template. It will be understood that the universal cutting machine shown in Fig. 1 is merely representative of tracer-guided machines, and that the invention can be used with many different kinds of machines.

A rigid frame or bracket 26 which extends lengthwise along the bar 17 has a fixed clamp jaw 27 at each end. These clamp jaws 27 extend under the bar 17 and for a short distance beyond the front side of the bar. At their upper ends the clamp jaws 27 are bifurcated and extend forward over a portion of the top surface of the bar. A shaft 30 extends through the upper ends of the clamp jaws. Cotter pins through the ends of the shaft 30 keep it from moving axially.

Movable clamping jaws 31 have upper end portions through which the shaft 30 extends to pivotally connect them to the bracket 26. The upper ends of the clamping jaws 31 extend between the bifurcations at the top of the jaws 27 and the bifurcations hold the movable jaws 31 against displacement lengthwise of the shaft 30.

The movable clamping jaws 31 extend down the front of the bar 17 and have forwardly extending ends substantially parallel with the forward ends of the clamp jaws 27. Cap screws 34 draw the ends of the cooperating jaws together to clamp the bracket 26 securely to the bar 17.

The template-follower includes a case 36 with projections 38 adjacent the ends of the case. The shaft 30 extends through the ends of the projections 38 and provides a hinge connection between the template-follower and the bracket 26. The projections 38 have surfaces 41 and the adjoining side of the case has surfaces 44 in such relation to the shaft 30 that they contact with the front and top of the bar 17 and prevent any further downward movement of the template-follower after it is lowered into working position.

Clamp members 46 are supported by the shaft 30 and have bifurcated upper ends extending on both sides of the projections 38 to hold the clamp members in the desired relation to these projections. Collars 48 hold the clamp members 46 and the projections 38 against displacement lengthwise along the shaft 30. Shackles 50 connected to the case 36 by pivot pins 53 can be hooked over the forwardly extending lower ends of the clamp members 46 when the template-follower is lowered into working position.

Thumb screws 55 threaded through bosses at the lower ends of the shackles 50 are screwed against the bottom faces of the forwardly extending ends of clamp members 46 to clamp the case 36 firmly against the bar 17.

Fig. 3 shows the template-follower in working position and clamped against the bar 17 to prevent any lost motion between the template-follower and the bar 17 of the universally movable supporting frame. The roller 21 is shown in contact with the guiding surface 23 of a template 24. The roller is driven by a governor-controlled electric motor 57 through reduction gearing and a drive shaft which extends through the case 36. The roller is magnetized by a coil 58 which surrounds the drive shaft of the roller. Switches for the motor and the magnetizing coil are carried in the case 36.

Only one embodiment has been used to illustrate the invention, but it will be apparent that other embodiments can be made within the scope of the claims.

I claim:

1. In a template-guided machine, a jointed frame, a rigid bracket securely fastened to the jointed frame, a template-follower hinged to said bracket, and releasable means for preventing relative movement of the template-follower and bracket when the template-follower is in working position.

2. The combination with a jointed frame and a tracing device for moving the jointed frame in accordance with the outline of a pattern, of a bracket fastened to the frame and connected to the tracing device by pivot connecting means of such a nature that the tracing device is movable toward and from the pattern, and releasable fastening means for holding the tracing device in working position.

3. Tracer apparatus including a bracket with a portion of its surface comprising a clamp jaw, a shaft extending through the bracket, a clamping jaw pivotally connected to the bracket by said shaft in position to cooperate with the jaw on the bracket to clamp said bracket to the machine with which the tracer apparatus is to be used, a case by which the pattern-following portion of the tracer apparatus is carried, and connections between the case and bracket including members through which said shaft extends.

4. Tracer apparatus including a bracket with a portion of its surface comprising a clamp jaw, a shaft extending through the bracket, a clamping jaw pivotally connected to the bracket by said shaft in position to cooperate with the jaw on the bracket to clamp said bracket to a supporting frame, a tracing device connected to the bracket for movement toward and from a pattern, and means for holding the tracing device in working position including quickly releasable clamping means hinged on said shaft.

5. The combination with a tracing device, of a shaft about which the tracing device swings to move it toward and from a pattern, a bracket through which the shaft extends, and a clamping jaw hinged to the bracket in position to clamp said bracket to a supporting frame, the shaft serving as the connection between the bracket and the clamping jaw.

6. The combination with a tracing device, of a shaft about which the tracing device swings to move it toward and from a pattern, a bracket through which the shaft extends, a clamping jaw supported by the shaft in position to cooperate with the bracket and clamp said bracket to a supporting frame, and other clamping means a part of which is carried by the tracing device and constructed and arranged to cooperate with another part connected to the bracket to hold the tracing device against movement with respect to the bracket.

JAMES L. ANDERSON.